3,052,318
LUBRICATION
Thomas R. Thomas, New York, N.Y., assignor to Auto Research Corporation, Dover, Del., a corporation of Delaware
Filed Aug. 17, 1960, Ser. No. 50,215
5 Claims. (Cl. 184—7)

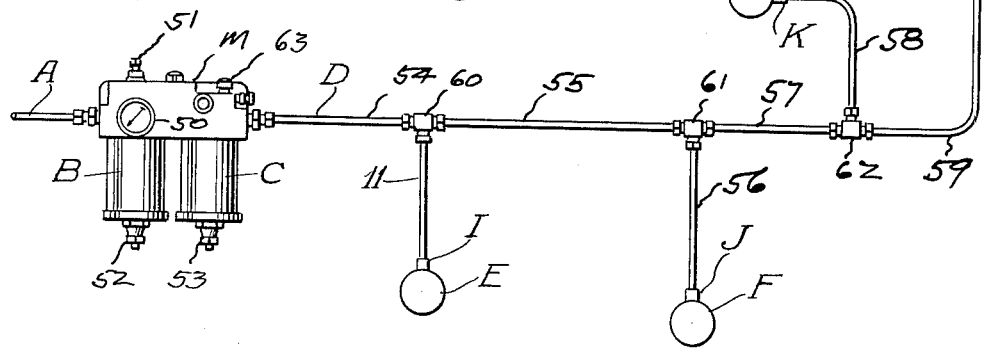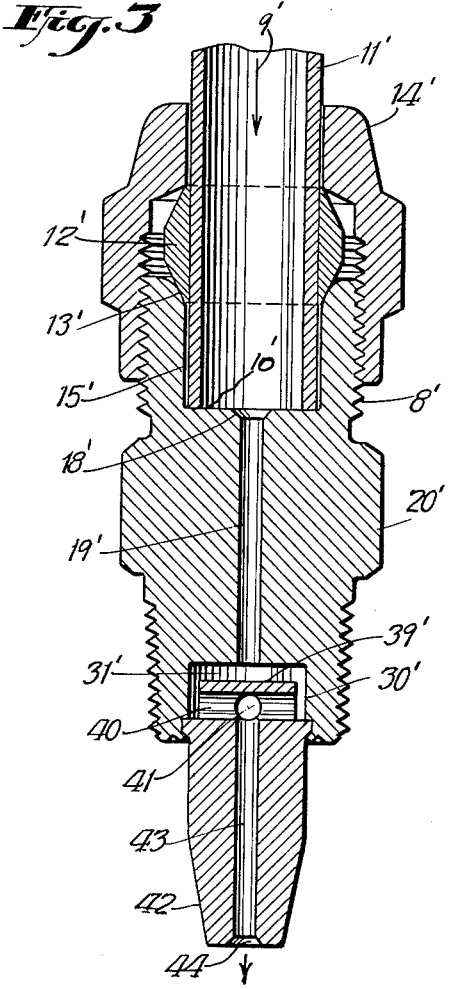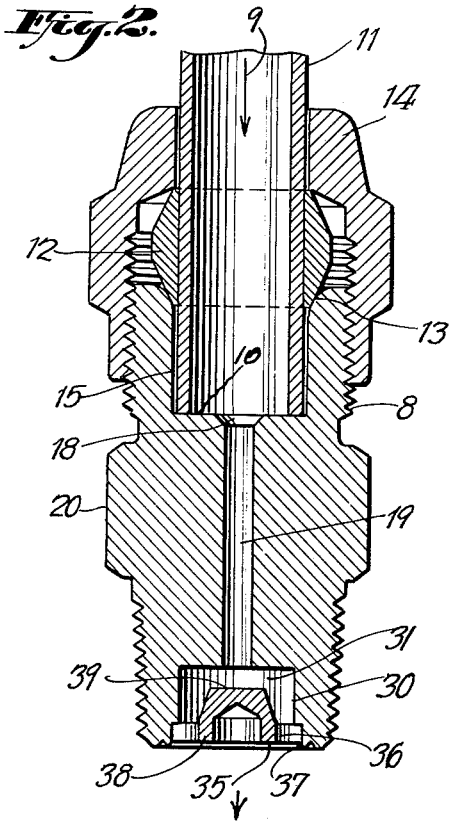

This application is a continuation-in-part of application Serial No. 657,775, filed May 8, 1957, now Patent No. 2,954,844.

The present invention relates to a lubricating system and it particularly relates to a centralized lubricating system in which the lubricant is suspended in the form of finely divided particles in air or in a gaseous fluid and then is conducted through a series of conduits or pipes where the fine particles are condensed or separated out as oil droplets and supplied to bearing surfaces.

It is among the objects of the present invention to provide a branched distributing lubricating installation of the character above described, in which predetermined quantities of lubricant, suspended as a finely divided mist in a gaseous fluid such as air, are passed through a branched distributing conduit or piping system to various bearings at different levels and at various distances from the source, with assurance that the lubricant will be condensed or solidified and then deposited or fed to the bearings in predetermined quantities, depending upon all the characters of the outlet fittings, without regard to their height or remoteness from the central lubricant source and with assurance that all bearings will be adequately lubricated without excess, even though they require relatively minute quantities of lubricant over a predetermined operational period.

Another object is to provide a novel centralized lubricating installation for feeding lubricants in accordance with the various bearing requirements of a machine or mechanism throughout the operating period of such machine, with assurance that each bearing will be supplied with the proper amount of condensed or solidified lubricant, without excess throughout the operation, regardless of the various distances between the outlets and the central source which generates and propels the suspension of mist particles into the bearing lines.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to a preferred embodiment of the present invention, the suspension of lubricant particles is obtained by straining or filtering compressed air so as to remove all moisture therefrom and then forcing it into a chamber directly above and opening into a pool of lubricant or oil in such a manner as to draw up lubricant or oil therefrom in small quantities and then thoroughly atomize it in the stream of air.

Desirably this may be accomplished by means of a nozzle or venturi tube device, which will direct the stream of filtered or purified compressed air across a chamber at the top of a lubricant well or pool, with said chamber being opened over its entire width into said lubricant pool or well, which serves as a reservoir.

Desirably a baffle is positioned directly across the stream of atomized or finely divided lubricant or oil carried by the air stream so as to remove and return directly to the lubricant pool the larger particles, so that the mist or suspended particles will have a predetermined distribution.

The central source of suspended lubricant particles desirably has a gauge to regulate the air pressure and an automatic diaphragm-valve arrangement to control the air pressure and pick up all the lubricant and atomization thereof.

The air stream should contain a predetermined range of finely divided lubricant mist particles having a size of the order of not less than .001 inch and desirably ranging from .005 inch to .001 inch.

Generally the source serves to clean the compressed air and dehydrate it, then to cause a pick-up and atomization of fine lubricant particles in the stream of air with a baffling arrangement to cause the larger particles to return directly to the reservoir under the mist generation chamber.

Such a device is shown in co-pending application, Serial No. 657,807, filed May 8, 1957, now Patent No. 2,954,846.

The present invention is particularly directed to the terminals or distribution proportioning outlets, which could open the particles or finely divided suspension of microscopic size, with the result that a condensation or solidification will take place, giving a proportioned supply of the condensed or solidified droplets to the bearing.

The terminal fittings desirably consist of fitting members which may be mounted on or adjacent the bearing having central passageways which have a restricted flow area ranging less than ¼ of the flow area of the conduits or tubing system leading to them and desirably from $\frac{1}{10}$ to ⅛ of the flow area leading to them.

The diameter of the restriction passageway may range from $\frac{1}{10}$ to ⅛ of the conduit or tubing flow passageway.

The entrance into this flow passageway is desirably at an abrupt abutment so that the stream, after striking a wall, must abruptly confine itself to a relatively narrow elongated passageway after the stream has struck a transverse abutment, with this passageway being positioned along the axis of the stream.

After passage through the narrow passageway, the stream then is expanded into a relatively flat, wide chamber of substantially the same width as the conduit, through which the finely divided particles have been previously conducted from the central source to the distribution outlets.

This abrupt variation in flow passageways, together with the provision of a flat abutment in the wide exit cavity, appears to result in a solidification and condensation of between 80% to 99% of the finely divided mist.

The condensation then may be completed by causing the mist to flow outwardly to the periphery of the outlet socket or outlet chamber, with the result that substantially complete condensation in droplet form will take place.

In one form of the invention, the solidified particles or droplets are permitted to pass directly out of the chamber upon the central abutment.

In another form of the device they are caused to undergo a changed direction of about 180° and to flow together to a central passageway in a nozzle.

This nozzle outlet is aligned with the restricted passageway and desirably is of almost the same length as the restricted passageway, but terminating so that its length will be between ⅔ to ¾ of the full length of the restricted passageway.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a diagrammatic lay-out of a mist distribution system, according to one embodiment of the present invention.

FIG. 2 is a transverse vertical longitudinal sectional view of one type of outlet solidification fitting, upon an enlarged scale as compared to FIG. 1.

FIG. 3 is a longitudinal sectional view of an alternative form of outlet fitting, upon an enlarged scale as compared to FIG. 1.

Referring to FIG. 1, there is shown a main mist or lubricator source M having a compressed air inlet A with an air dehydrating unit B and an oil or lubricant supply unit C.

This unit is provided with a gauge 50, an air pressure regulator adjustment 51, and with the drain plugs 52 and 53.

The unit M will discharge into the main inlet of the conduit system at D a finely divided mist.

This mist will flow through the piping sections 54, 55, 56, 57, 58 and 59 and through junctions 60, 61 and 62.

The typical branch outlet is indicated at 11, leading to the metering or proportioning outlet fitting I, which in turn leads to the bearing E.

The branch pipe 56 leads to the unit J feeding the bearing F.

The branch pipe 58 leads to the unit K feeding the bearing G, while the branch pipe 59 leads to the metering unit L feeding the bearing H.

In the operation of the unit of FIG. 1, the air under compression is pumped through the inlet connection A to the dehydrating chamber B, where it is filtered, and then it flows through the head into and across the top of the chamber C consisting of the lubricant reservoir having a filler cap 63, and where it acquires a pick-up of finely divided lubricant particles. It then flows into the distributing system consisting of the tubing elements 54, 55, 56, 57, 58 and 59.

The present invention is particularly directed to the fittings shown in section in FIGS. 2 and 3.

Referring to the fitting of FIG. 2, the branch connection 11 will contact the stream of air with the finely divided particles, as indicated at 9, into the inlet passageway, which abruptly terminates at the wall 10.

The tubing, which may be nylon or copper, fits into the coupling nut 14, which presses and deforms the double tapered coupling sleeve 12 against the curved abutment portion 13 at the inlet to the chamber 15 of the fitting 20.

The nut 14 is screwed upon the threaded inlet end 8 of the fitting 20. By tightening up the nut 14, a tight connection may be made by deforming the tapered ends of the double tapered coupling sleeve 12 on to the tubing end 11.

At the closely spaced baffle 10 there will be a slight conical recess 18, centrally positioned of the flow passage 9.

The flow then must abruptly confine itself to the elongated narrow passageway 19, shown as being about between 1/8 and 1/4 of the flow area of the passageway of the conduit 11.

This passageway then abruptly opens into the shallow, wide socket 31 at the outlet of the fitting 20, and, as the flow leaves the passageway 19 it immediately strikes the abutment face 39 of the outlet dome member 38.

This outlet dome member 38 has the outside edge 35 with outstanding spider members 36, which are peened or otherwise held in position at 37 in the outlet threaded end of the fitting 20.

The abrupt confining of the flow passageway from the abutment wall 10 to the flow passage 19, followed by the sudden release at 31, with the abutment at 39, with the relatively free peripheral flow passage in the upper portion of the socket 30, will result in the condensation or solidification of the droplets, which then pass out through the spider elements 36 into the bearings E, F, G or H.

In the alternative form of fitting of FIG. 3, the same or similar elements are indicated by the same numerals as in FIG. 2, which, however, are primed.

In FIG. 3 the flow passage 9' abruptly terminates at the abutment wall 10' and the stream made mist then condenses itself to flow through the narrow elongated passageway 19'.

Then the release will take place in the shallow outlet socket or chamber 30', where the narrowed stream will strike the abutment 39', consisting of a circular face blocking the outlet of the passageway 19' and extending substantially to the periphery of the interior of the socket 30'.

Instead of releasing the stream as it flows around the abutment surface 39' and then through the periphery of the socket 30', there is an abrupt change of direction of 180° to cause the stream to flow into the right angular bores 40 and 41, where the subdivided stream will abruptly come to a common central point at the inlet of the bore 43 in the nozzle or elongated drip element 42.

This element 42 is held in position to block the outlet of the shallow socket 30'.

At the outlet 44 there is a slight relief, but as a result of this abrupt varying of the flow passage at 19'; the widening and abutment at 39'; the peripheral flow at 30'; the subdivision and central confluence at 40 and 41; and the elongated continuation passage 43, there will be a substantially complete condensation of the finely divided particles, which then may be discharged into the bearings E, F, G and H.

These units of FIGS. 2 and 3 give an unusually high, effective condensation and solidification of the mist particles and they will result in the oil being fed in proportioned quantity to the bearings.

The finely divided lubricant particles will then be condensed as droplets and fed to the bearings in predetermined proportioned quantities. The proportionment may be accomplished by changing the ratio of the flow passageway 19 and 19' in respect to the inlet passageway 9 and 9'.

As many changes could be made in the above lubrication, and many widely different embodiments of this invention could be made without departure from the scope of the claims, it is intended that all matter contained in the above description shall be interpreted as illustrative and not in a limiting sense.

It has been found that a mist has certain critical properties particularly where the size of the mist particles vary from .005 to .001 inch and that when such a mist is forced with a stream of compressed air through a flow area ranging from one-tenth to one-eighth of the flow area of the tubing system that when the flow of mist is suddenly caused to open in a relatively wide chamber and butt a closely spaced baffle, there will be a deposition of 99% of the entrained mist which appears to form substantially solid particles which then liquefy upon striking the surface to be lubricated. The preferred restricted flow area should be one-fourth to one-tenth of the flow area in the conduit system and this particular relationship was only found after years of experimentation and is not merely a matter of design.

Having now particularly described and ascertained the nature of the invention, and in what manner the same is to be performed, what is claimed is:

1. In a lubricant distribution system of the type having a central source of a finely divided suspension of lubricant particles in a stream of air and a branched distributing conduit system to lead said suspension to bearings being lubricated; the combination therewith of a proportioning solidification outlet fitting having a relatively wide inlet passageway of the same flow area as the conduit system, a central elongated restriction passageway having a flow area about $\frac{1}{10}$ to ¼ of the conduit system, a wide outlet socket of about the same flow area as the inlet passageway, and a fixed closely spaced baffle directly at the opening of the restriction passageway into the socket.

2. The system of claim 1, said outlet fitting further consisting of a large chamber socket at the baffle of the restricted passageway receiving said baffle and the flow in said socket being caused to pass to and through the periphery of the socket after striking said fixed baffle.

3. The system of claim 1, said baffle consisting of a domed member projecting into the socket and presenting a flat circular face adjacent to and extending on each side of the outlet of the restriction passageway.

4. The system of claim 1, said baffle having a nozzle with an inlet portion and blocking the outlet of said socket and having a central longitudinal passageway aligned with and of the same flow area as said restriction passageway and having transverse inwardly directed passages at the inlet thereof beyond the baffle in the direction of flow.

5. In a lubricant distribution system of the type having a central source of a finely divided suspension of lubricant particles in a stream of air and a branched distributing conduit system to lead said suspension to bearings being lubricated; the combination therewith of a proportioning solidification outlet fitting having a relatively wide inlet passageway of the same flow area as the conduit system, a central elongated restriction passageway having a flow area about $1/10$ to $1/4$ of the conduit system, a wide outlet socket of about the same flow area as the inlet passageway, and a fixed closely spaced baffle directly at the opening of the restriction passageway into the socket, a large chamber socket at the baffle of the restricted passageway receiving said baffle and the flow in said socket being caused to pass to and through the periphery of the socket after striking said fixed baffle, said baffle consisting of a domed member projecting into the socket and presenting a flat circular face adjacent to and extending on each side of the outlet of the restriction passageway, said baffle having a nozzle with an inlet portion and blocking the outlet of said socket and having a central longitudinal passageway aligned with and of the same flow area as said restriction passageway and having transverse inwardly directed passages at the inlet thereof beyond the baffle in the direction of flow.

References Cited in the file of this patent

UNITED STATES PATENTS

| | | |
|---|---|---|
| 2,353,734 | Kocher | July 18, 1944 |
| 2,753,953 | Tear | July 10, 1956 |
| 2,772,750 | Bystricky | Dec. 4, 1956 |
| 2,939,487 | Fraser | June 7, 1960 |
| 2,954,844 | Thomas | Oct. 4, 1960 |
| 2,959,249 | Gothberg | Nov. 8, 1960 |